United States Patent [19]

Burkhardt et al.

[11] Patent Number: 4,530,155
[45] Date of Patent: Jul. 23, 1985

[54] METHOD AND APPARATUS FOR REPRODUCING A REFERENCE POSITION IN AN INCREMENTAL MEASURING DEVICE

[75] Inventors: Horst Burkhardt, Truchtlaching; Alfons Ernst; Holmer Dangschat, both of Traunreut, all of Fed. Rep. of Germany

[73] Assignee: Dr. Johannes Heidenhain GmbH, Traunreut, Fed. Rep. of Germany

[21] Appl. No.: 591,407

[22] Filed: Mar. 20, 1984

[30] Foreign Application Priority Data

Mar. 26, 1983 [DE] Fed. Rep. of Germany ....... 3311203
Nov. 11, 1983 [DE] Fed. Rep. of Germany ....... 3340866

[51] Int. Cl.³ .............................................. G01B 11/00
[52] U.S. Cl. ...................................... 33/1 L; 33/1 PT; 33/125 C; 356/138
[58] Field of Search .......... 33/1 L, 1 N, 1 PT, 125 C, 33/363 K; 358/138, 141, 148, 152

[56] References Cited

U.S. PATENT DOCUMENTS

| 3,637,312 | 1/1972 | Cantor et al. | 356/138 |
| 3,997,782 | 12/1976 | Willits | 356/138 |
| 4,318,225 | 3/1982 | Jenkinson | 33/1 PT |
| 4,393,591 | 7/1983 | Conta | 33/1 L |

FOREIGN PATENT DOCUMENTS

| 1673887 | 1/1968 | Fed. Rep. of Germany . |
| 1964381 | 12/1969 | Fed. Rep. of Germany . |
| 7101141 | 1/1972 | Fed. Rep. of Germany . |
| 2952106 | 12/1979 | Fed. Rep. of Germany . |

*Primary Examiner*—Willis Little
*Attorney, Agent, or Firm*—Willian, Brinks, Olds, Hofer, Gilson & Lione, Ltd.

[57] ABSTRACT

A calibration process and apparatus are disclosed for allowing a reference position to be determined at any time, independent of the momentary position of the two objects movable relative to one another to be measured. One of the two objects to be measured is decoupled from the measuring device and then either the scanning plate or the measuring graduation of the measuring device is moved until it comes into alignment with a reference mark. This scanning of a reference mark causes a counter included in the measuring system to be set at a predetermined value such as zero. From this point up to the point the scanning plate or measuring graduation is returned to the momentary starting position, the grid lines of the graduation on the graduated plate are counted. In this way, the absolute position of the momentary starting position is determined. After all components of the measuring device have been returned to the momentary starting position, the measuring position is re-established, and the working operation can be resumed.

16 Claims, 9 Drawing Figures

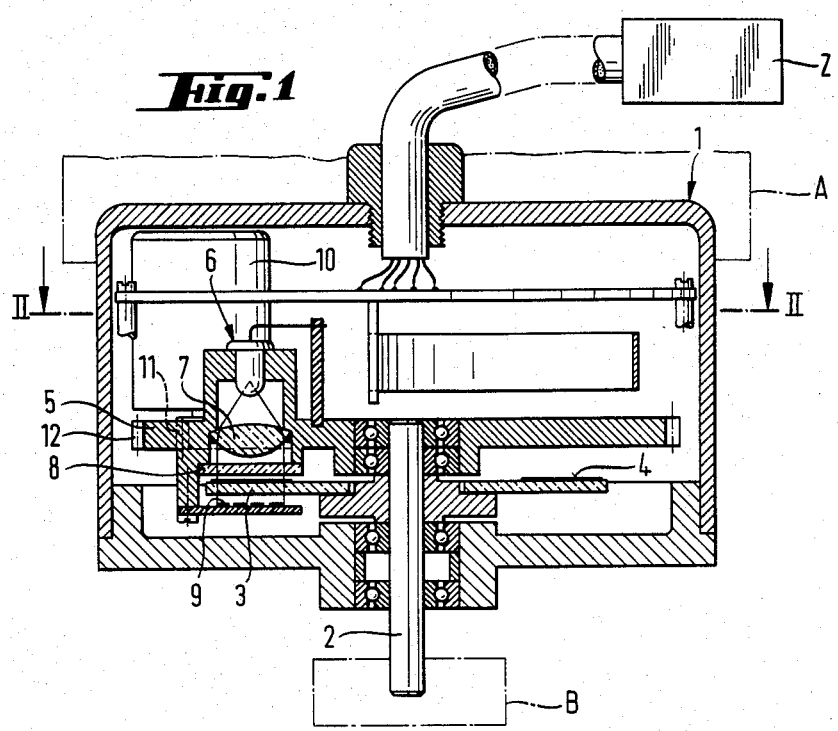
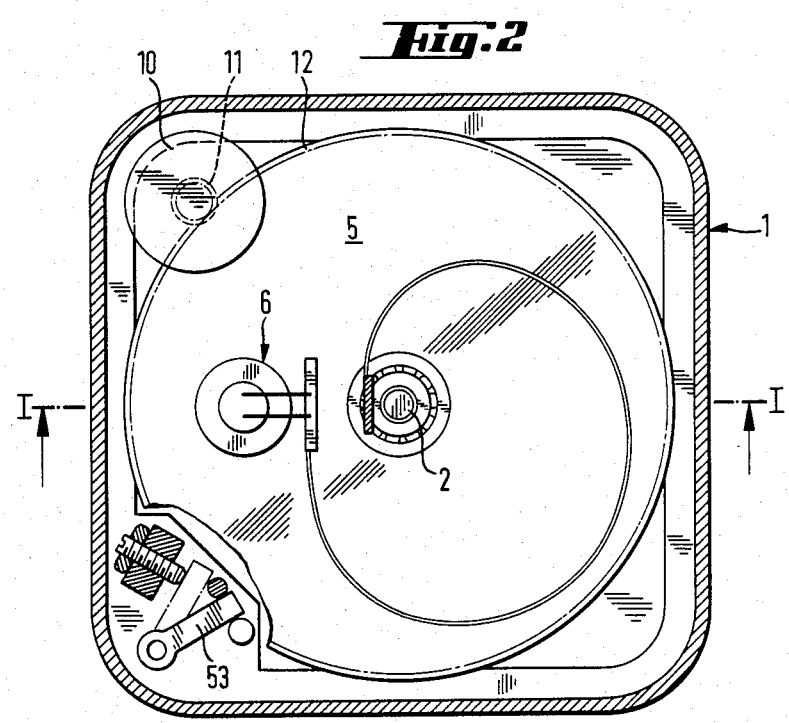

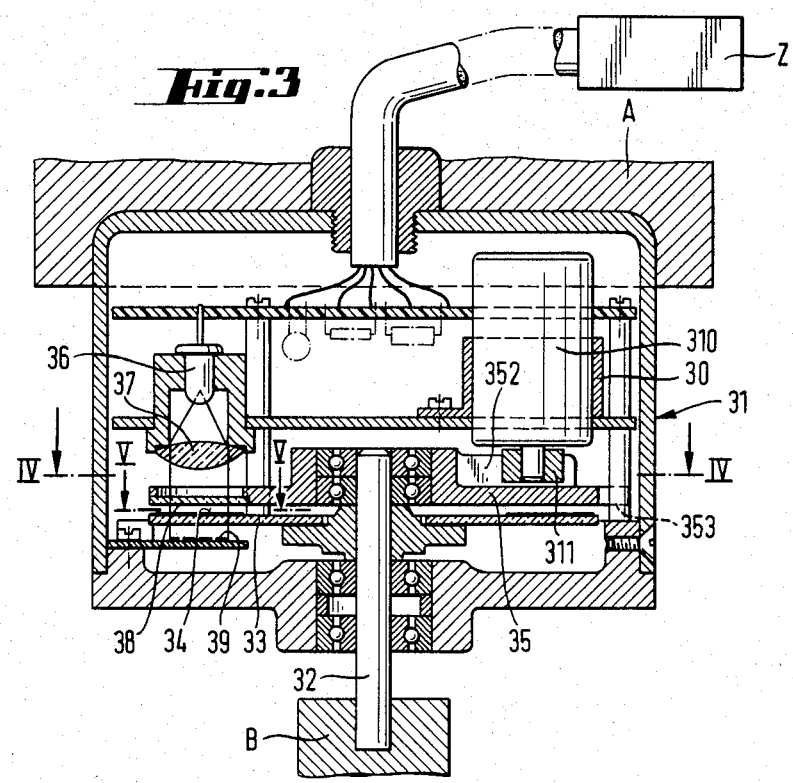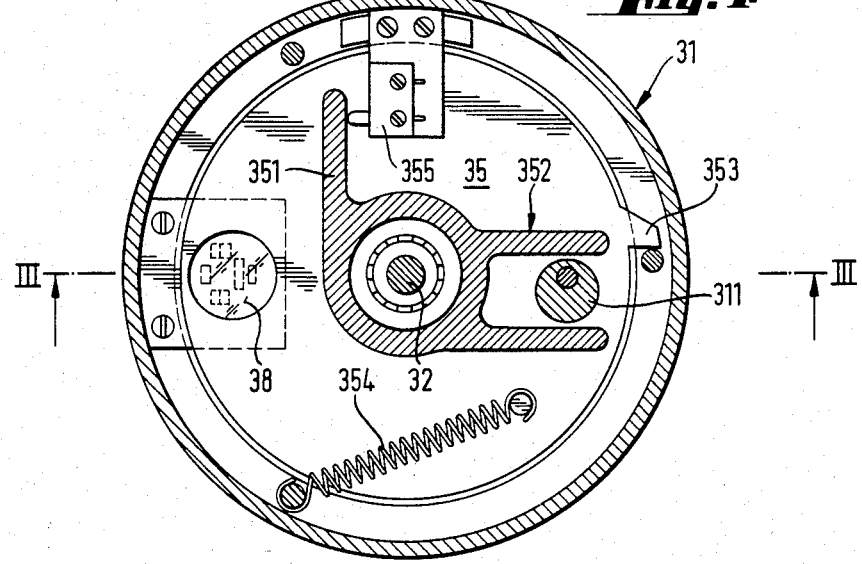

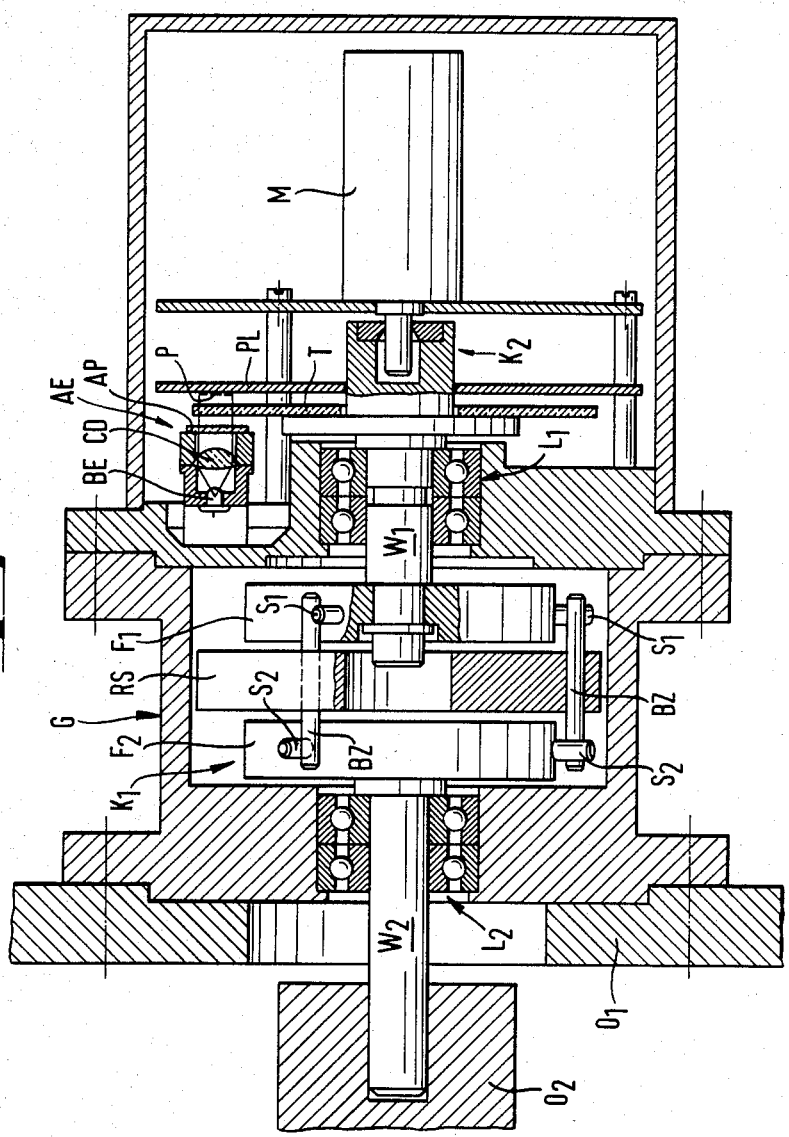

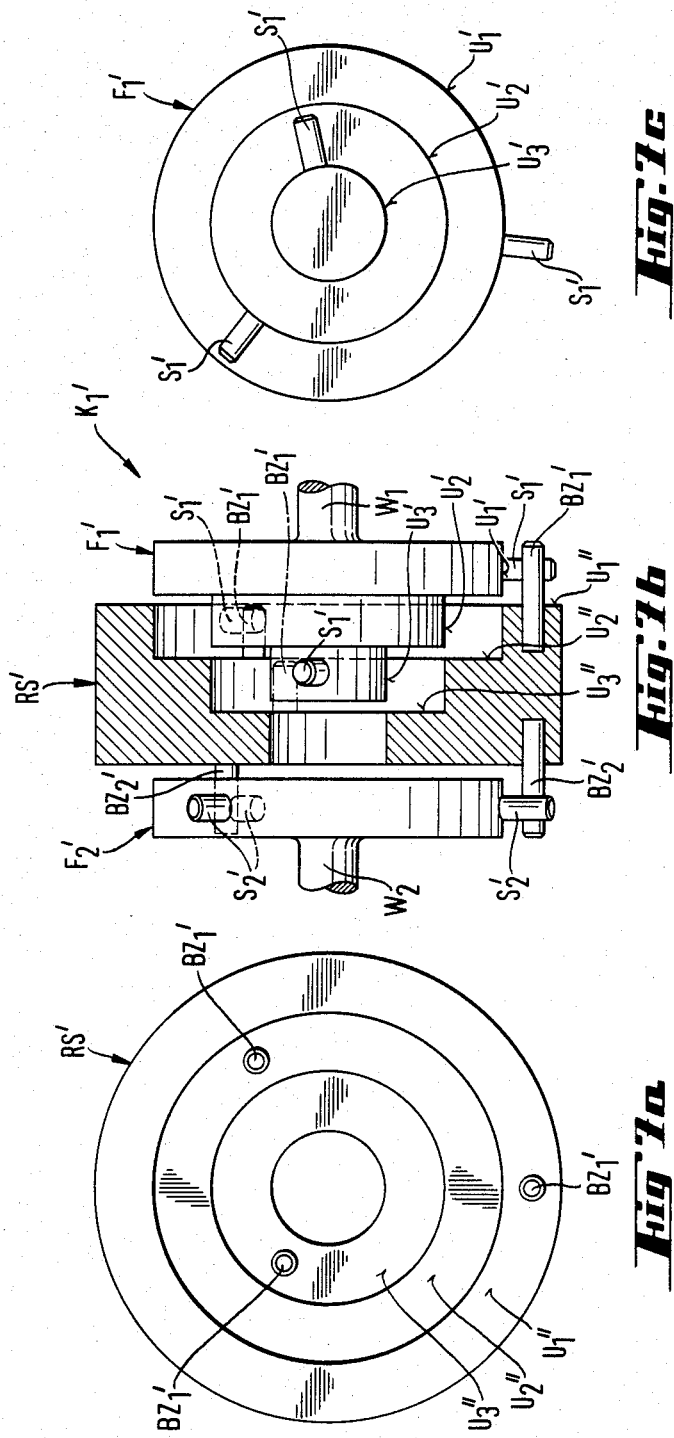

METHOD AND APPARATUS FOR REPRODUCING A REFERENCE POSITION IN AN INCREMENTAL MEASURING DEVICE

BACKGROUND OF THE INVENTION

The present invention relates to a system for reproducing a reference position in an incremental path measuring system of the type which includes an incremental measuring graduation provided with at least one reference mark secured to one of the objects, the position of which is to be measured, and a scanning arrangement secured to the other of the objects, the position of which is to be measured.

Systems for determining reference positions in incremental measuring devices are known to the art, in which machine or measuring system components which are movable relative to one another are moved from a starting position to a reference position. The distance traveled between the starting position and the reference position is measured and stored, or the reference position defined by a reference mark is used to determine a position, such as a zero position in a measuring system. Such a process can be used, for example, in an incremental length or angle measuring system such as that described in German patent DE-PS No. 19 64 381. This process requires, however, an unimpeded relative movability of the objects to be measured, since the components of the measuring arrangement are firmly connected with the objects to be measured and the objects to be measured must be shifted in unison with the components of the measuring system up to the position defined by the reference mark.

German DE-OS No. 16 73 887 discloses a prior art measuring system in conjunction with a machine which includes a slide piece and a bed. The disclosed measuring system can be used to determine a reference position when the slide piece is clamped fast to the machine bed. As a first step of the disclosed system, the slide piece is driven into the position which is later to be taken as the reference or zero position. The slide piece is then clamped fast to the machine bed and the scanning plate is then moved relatively to the scale until a reference mark is detected. On reaching the reference mark, the electronic counter of the measuring system is set to zero. The clamping for the machine parts can then be released and the slide piece moved into its desired position. The position of the reference mark, therefore, represents the reference position for further operating cycles.

These prior art methods for determining a reference value for a starting position (which occurs before the beginning of the working cycle proper) cannot in general be used with an incremental measuring system if the working cycle has already commenced. For example, such methods are not as a general rule suitable for use in working cycles that are interrupted while in progress. Such interruptions of a running working cycle can occur, for example, in the case of an automatic handler such as an industrial robot in the event of a power failure. In this case the robot will remain at a standstill at the momentary position it occupied at the instant of power failure. As a result of the power failure, the measuring value determined previously according to the methods described above and referred to the original reference position is lost, since the measurement is interrupted.

In order to continue an interrupted working cycle, the reference position must be redetermined in some manner. A return movement of the robot out of its momentary position into the original starting position is not possible as a general rule. For example, a tool held by the robot may happen to be in engagement with a workpiece at the time of the power interruption, thereby preventing relative movement between the tool and the workpiece.

SUMMARY OF THE INVENTION

The present invention is directed to an improved method for reproducing a reference position and devices for the execution of this method which eliminate the disadvantages of the prior art processes and devices described above. The present invention makes it possible to determine a reference position after a measurement has been interrupted and the measuring system has been moved to an unknown momentary position, without movement of the objects to be measured.

According to this invention after an interruption of a measuring operation caused for example by a power failure, when the first and second objects to be measured and the measuring system are in respective momentary positions, one of the measuring graduation and the scanning component of the measuring system is decoupled from the respective one of the first and second objects. Then this one of the measuring graduation and the scanning unit is shifted until one of the reference marks is scanned. Finally, the shifted one of the measuring graduation and the scanning component is returned to its original momentary position and then fixed in relative position with respect to the respective one of the relatively movable objects. The return path between the scanning of the reference mark and the respective momentary position is measured to determine the absolute position of the measuring graduation in its momentary position.

As discussed in detail below, this method can be implemented in a number of different types of measuring systems which rely on movement of either the entire scanning unit, the scanning plate or the measuring scale to determine the reference position. Further advantageous developments of this invention are set forth in the dependent claims.

The present invention provides important advantages in that the method of this invention permits a reference position to be determined in a simple and rapid manner after a measurement has been interrupted, and after the measuring device has been moved to an unknown momentary position. All of this is obtained without any necessary movement of the objects to be measured. Thus, in the event one of the objects to be measured takes the form of a tool, even when the measuring process is interrupted by a disturbance such as a power failure, the tool can remain in engagement with the workpiece while the reference position is redetermined. For this reason, after the disturbance has been eliminated and the reference position has been determined, the interrupted processing operation can immediately be continued or resumed. A withdrawal of the tool from the point of engagement on the workpiece and a renewed exact restarting of this tool at the engagement point is time-consuming and difficult, and can lead to damage to the workpiece. In addition, the method and apparatus of this invention make it possible, for example in connection with robots, to check particular reference positions in a programmed, controlled manner between individual processing operations on separate workpieces. In this way, the operating security of the system can be considerably improved.

The invention itself, together with further objects and attendant advantages, will best be understood by reference to the following detailed description, taken in conjunction with the accompanying drawings.

BRIEF DESCRIPTION OF THE DRAWINGS

FIG. 1 is a cross-sectional view of an angle measuring device which incorporates a first preferred embodiment of the apparatus of this invention.

FIG. 2 is a sectional view of the apparatus of FIG. 1 taken at right angles to the plane of FIG. 1.

FIG. 3 is a cross-sectional representation taken along line III—III of FIG. 4 of an angle measuring device which incorporates a second preferred embodiment of the apparatus of this invention.

FIG. 4 is a sectional view taken along line IV—IV of FIG. 3.

FIG. 6 is a longitudinal sectional view of an angle measuring device which incorporates a third preferred embodiment of this invention.

FIGS. 7a, 7b and 7c are a first elevational view, a longitudinal sectional view, and a second elevational view, respectively, of an alternate coupling arrangement suitable for use in the embodiment of FIG. 6.

DETAILED DESCRIPTION OF THE PRESENTLY PREFERRED EMBODIMENTS

Figure 5:
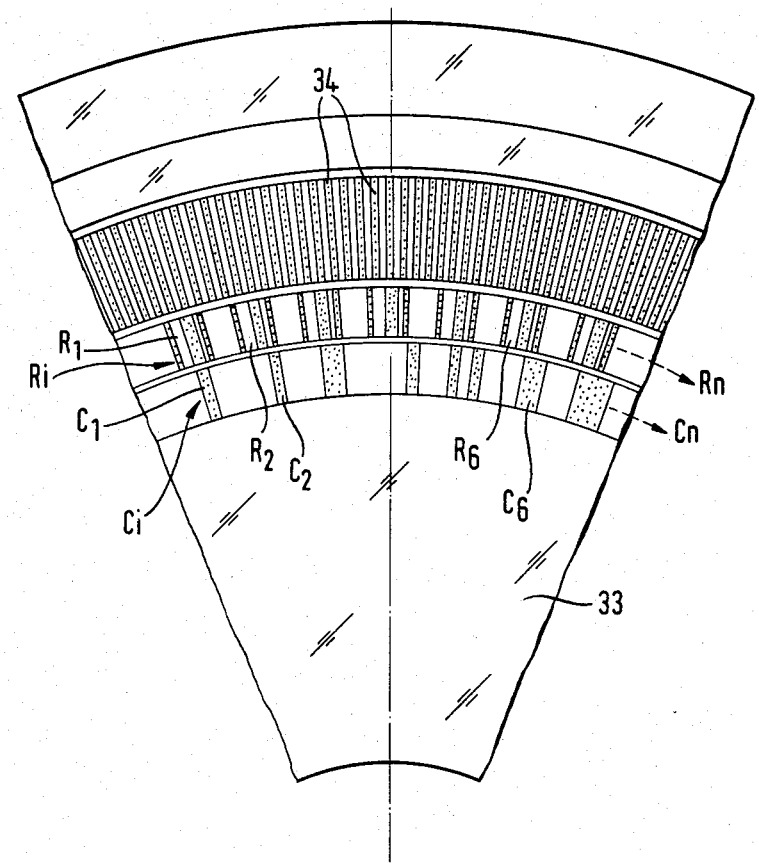
FIG. 5 is a fragmentary sectional view taken along line V—V of FIG. 3.

Turning now to the drawings, FIGS. 1 and 2 represent a first preferred embodiment of the apparatus of this invention in longitudinal and cross-sectional views. As shown in FIGS. 1 and 2, the disclosed angle measuring system includes a housing 1 which is fastened in use to the housing A of an industrial robot (not shown). A shaft 2 is rotatably mounted in the housing 1 and extends into the interior of the housing 1. A disc 3 which bears an incremental graduation 4 in the form of a grid is mounted to the shaft 2 to rotate with the shaft 2. The incremental graduation 4 is photoelectrically scanned. For this purpose, there is provided a second disc 5 which is rotatably mounted on the shaft 2. During normal operation of this measuring system, the second disc 5 remains at a predetermined stationary position. An illuminating arrangement 6, a condenser lens 7, a scanning plate 8, and photosensors 9 (which together make up a scanning unit) are fixed to the second disc 5 and in a similar manner remain in fixed position during normal operation of the system. On rotation of the graduated disc 3, relative movement between the incremental graduation 4 and the scanning plate 8 is detected by the modulation of light passing through the incremental graduation 4 and the scanning plate 8 in a known manner by the photosensors 9. The photosensors 9 operate to generate scanning signals which are counted to determine a measuring value in an electronic counter (not shown).

Since the second disc 5 remains stationary with respect to the housing 1 during normal measuring operation, rotary movements of the shaft 2, which carries the graduated disc 3, can be precisely measured.

In an industrial robot, the housing 1 is typically firmly fastened in place to the housing A of the industrial robot. The shaft 2 can be rigidly joined with a handling component such as a gripping device B. Rotational movement executed by the gripping device B is detected by the measuring system and transmitted to an evaluating circuit (not shown) for measuring or control purposes. In order to obtain a reference or base position in such an incremental measuring device, reference marks are provided alongside the graduation 4. (For example, German DE-OS No. 16 73 887 mentioned previously and German patent DE-PS No. 29 52 106 describe two examples of such reference marks.) Before the start of a processing cycle (and therefore before the commencement of a new measuring cycle) the gripping device B is rotated until one of the reference marks is detected by the scanning unit. This position is then defined as a zero position or as some other numerical value which has been either previously established or determined by program. Whatever the numerical value chosen, it is placed in the counter Z. During the subsequent working movement of the robot this value, chosen at the outset and loaded into the counter Z, is used as the reference or base of the measurement. The setting of the reference base can be done, for example, in the manner described in German DE-OS No. 16 73 887, on page 14.

If during a working cycle a disturbance such as a power failure occurs, then the working cycle will be interrupted along with the measurement.

During an interruption of power to the measuring device, the measurement value prevailing at the moment of power failure is lost, and therefore the previously determined reference base of the measurement with respect to the starting position is lost as well. However, as explained above, as a general matter the gripping device B may be in engagement at the time of the disturbance. For this reason, it often is not possible to rotate the gripping device B until the original reference mark is detected by the scanning unit, as may be done at the beginning of the working cycle described above.

With the system of this invention, however, the reference position can readily be redetermined, even in the event the gripping device B cannot be rotated. According to this invention, the measuring system is equipped with a drive motor 10. The drive motor 10 operates to rotate a pinion gear 11 which engages an outside gear 12 defined by the disc 5 (see FIG. 2). In the event of a disturbance such as a power interruption, the drive motor 10 is driven and the gear linkage comprising pinion 11 and gear 12 rotates the disc 5 until the scanning unit consisting of the illuminating device 6, the condenser lens 7, the scanning plate 8, and the photosensors 9 comes into alignment with a reference mark. Once a reference mark is detected the counter of the evaluating unit is again set on zero or on some other selected value, the drive motor 10 is switched off, and the disc 5 returns to the position it occupied at the instant the normal measuring process was interrupted. During the return of the disc 5 to its previous position the increments of the grid graduation 4 are counted by the scanning unit and therefore the distance of the momentary position of the disc 3 with respect to the reference position is again established.

During this calibration process the robot is at a standstill. The housing 1, the shaft 2, and the graduated disc 3 do not move. After this calibrating procedure for redetermining the reference position has been completed, the working cycle can be resumed.

The method of this invention can be carried out in a particularly advantageous manner with the apparatus shown in FIGS. 3-5.

As shown in these figures, a measuring system can include a housing 31 which mounts a shaft 32 for rotation. The shaft 32 carries a disc 33 which defines an incremental grid graduation 34. FIG. 5 represents a portion of the disc 33. In the interior of the housing 31 the shaft 32 carries another disc 35 on which is mounted a scanning plate 38. The disc 35 is rotatably mounted on the shaft 32 and defines on its upper side facing away from the graduated plate 33 a superstructure which is provided with a switching arm 351 and a fork 352. Between the arms of the fork 352 is positioned an eccentric 311 which is mounted on the axle of a drive motor 310. The drive motor 310 is fastened in a fixed position inside the housing 31 by means of a bracket 30. An illuminating arrangement 36, condenser lens 37, and associated photosensors 39 for the scanning of the grid graduation 34 and of the reference marks $R_1-R_n$ are likewise arranged in fixed position in the housing 31. In the rest state, the disc 35 occupies a predetermined rest position which can be adjusted and is determined by means of a stop 353. This rest position is occupied by the disc 35 during normal operation of the measuring device. Normal measuring functions are performed in this embodiment in a manner identical to that of the embodiment of FIGS. 1 and 2.

However, in the event of an interruption in the measuring process (such as that associated with a power failure) the process for redetermining the reference position can be executed very rapidly.

By means of the illuminating arrangement 36 and the condenser lens 37, an illumination field of a predetermined size is determined. The spatial arrangement of the reference marks $R_1-R_n$ and of the photosensors 39 is chosen to be appropriate for the size of this illumination field. As best shown in FIG. 5, there is provided a series of reference marks $R_1-R_n$ alongside the grid graduation 34. The reference marks $R_1-R_n$ are arranged on a concentric track. Each of the individual reference marks $R_1-R_n$ is associated with a respective code mark $C_1-C_n$ and in this way each of the reference marks $R_1-R_n$ is in effect numbered. The code mark $C_i$ characterizes the spacing or absolute position of the associated reference mark $R_i$ with respect to a predetermined zero point of the grid graduation 34. The distribution of the reference marks $R_1-R_n$ is such that the reference mark $R_1$ is exactly 100 grid division lines from the zero point of the graduation, the reference mark $R_2$ is exactly 200 grid division lines from the zero point of the graduation, and so forth. In this example, the grid spacing or grid constant of the grid graduation 34 is 40 microns, and one of the reference marks $R_i$ is therefore arranged every four millimeters around the reference mark track. The size of the illuminated field is chosen in such a way that at every possible position of the graduated plate 33 at least one of the reference marks $R_1-R_n$ and the associated code mark $C_1-C_n$ is positioned within the illuminated field.

In the event of a loss of a previously determined reference position, the second of the rotatable discs 35 which carries the scanning plate 38 must be rotated through a path of no more than 4 millimeters in order to cause one of the reference marks $R_1-R_n$ and the associated code mark $C_1-C_n$ to be scanned with certainty. Once one of the reference marks $R_i$ has been scanned, the counter Z is then loaded with a numerical value indicative of the absolute position of the scanned reference mark $R_i$, which numerical value is established by the associated code mark $C_i$ of the scanned reference mark $R_i$. After this value has been loaded into the counter Z, grid lines of the graduation 34 are counted during the return rotational movement of the disc 35 until the disc 35 has reached its starting position—as fixed by the stop 353. Once this has been accomplished the momentary position of the disc 33 with respect to the zero position of the disc 33 has now been determined. This momentary position is represented as the measurement value that is determined from the reference mark position (determined from the code mark) and the counting value (determined from the grid lines of the graduation 34) added to or substracted from this reference mark position as appropriate. This counting value which is added or subtracted to the reference mark position is determined in the return movement of the scanning plate 38 and the disc 35.

The illuminating arrangement 36 will in many cases be adversely affected by vibrations, accelerations, and the like, and it is therefore important to note that the calibration process described above does not require movement of the illuminating arrangement 36. The illuminating arrangement 36 will therefore have a relatively long life. Furthermore, adjustment problems related to the illuminating arrangement 36 do not arise because of the invariable position of the illuminating arrangement 36.

In this embodiment the swinging movement of the disc 35 is accomplished by the drive motor 310, on the drive shaft of which there is positioned an eccentric 311. The eccentric 311 lies between the arms of the fork 352, which is defined by the superstructure on the upper side of the disc 35. In a single revolution of the motor 310, the linkage made up of the eccentric 311 and the fork 352 causes the disc 35 to be rotated through a path of 4 millimeters and returned to its starting position on the stop 353. A spring 354 promotes the return swinging motion of the disc 35 and assures precise and exact engagement of the stop 353 agsinst the stop pin shown in FIG. 4. At the moment the disc 35 returns to its starting position, the switching arm 351 on the upper side superstructure of the disc 35 actuates a switch 355 which stops the drive motor 310.

The drive motor 310 presents a small time constant, so that a revolution of the eccentric 311 and therefore a complete swinging movement of the disc 35 is completed within a tenth of a second.

With the above-described measuring arrangement the calibration process of this invention can be carried out so rapidly that calibration operations can be performed in other situations in addition to situations in which an interruption or disturbance has caused the reference position to be lost. For example, with such a calibration step requiring only a tenth of a second for execution, it is possible to recalibrate robots directly between processing of individual workpieces. This approach provides a number of calibrating operations which may be controlled automatically by computer program without manual intervention, thereby considerably improving the operating security of such a system.

It lies within the scope of this invention to carry out this particularly advantageous process also in other measuring devices, for example in length measuring systems. Likewise, it will be understood that one skilled in the art may well chose to substitute other drive arrangements to shift the scanning plate for the drive motor shown in the drawings.

Turning now to FIG. 6, this drawing shows a third angle measuring system in longitudinal section which defines a housing G which is fastened to an object $O_1$ to be measured, such as a housing of an industrial robot (not shown). In the interior of the housing G there is rotatably mounted a first shaft $W_1$ by means of bearings $L_1$. This first shaft $W_1$ carries a graduated plate T which defines an incremental graduation as well as an array of reference marks which are absolutely positioned at predetermined locations with respect to the incremental graduation. The incremental graduation and the reference marks of the graduated plate T are photoelectrically scanned by a scanning unit AE which is secured inside the housing G. This scanning unit AE includes an illuminating unit BE with a condenser lens CD, a scanning plate AP and photosensors P mounted on a plate PL secured inside the housing G. Rotation of the graduated plate T is detected by modulation of light passing through the divisions of the graduated plate T and the scanning plate AP to the photosensors P. The photosensors P operate to generate periodic scanning signals which are applied to a counter which determines a measurement value for the relative position of the graduated plate T with respect to the scanning unit AE.

The first shaft $W_1$ which carries the graduated plate T is connected by means of a follower coupling $K_1$ with a second shaft $W_2$, which is similarly mounted in the interior of the housing G by means of bearings $L_2$. This second shaft $W_2$ projects from the housing G and is fastened to the other rotatable object $O_2$ to be measured. This other rotatable object $O_2$ can for example be a gripping device included in an industrial robot.

The follower coupling $K_1$ is made up of a connecting hub $F_1$ which is fastened to the shaft $W_1$, a connecting hub $F_2$ which is fastened to the shaft $W_2$, as well as an annular disc RS. Each of the two connecting hubs $F_1, F_2$ defines three stops $S_1, S_2$, respectively. Each set of three stops $S_1, S_2$ projects radially from the periphery of the respective connecting hub $F_1, F_2$, and the three stops $S_1, S_2$ in each set are offset with respect to one another by an angle of 120°. Between the two connecting $F_1, F_2$, there is arranged the annular disc RS which defines at its periphery three bolts BZ. The bolts BZ are offset with respect to one another by 120° and they each project in an axial direction, parallel to the shafts $W_1, W_2$. Thus, the bolts BZ project in the axial direction from bores on both sides of the annular disc RS and the bolts BZ are in contact with the stops $S_1, S_2$ of the connecting hubs $F_1, F_2$ during rotation of the shafts $W_1, W_2$. The annular disc RS has no bearing of its own, and by reason of the symmetrical arrangement of the bolts BZ is self-centering during rotation of the shaft $W_1, W_2$ and exerts no transverse forces on the bearings $L_1, L_2$ of the shafts $W_1, W_2$. The bolts BZ cooperate with the stops $S_1, S_2$ to support the annular disc RS in place between the connecting hubs $F_1, F_2$.

The follower coupling $K_1$ with a selected direction of rotation of the rotatable object $O_2$ and thereby of the shaft $W_2$ ensures that rotation of the shaft $W_2$ is transmitted via the bolts BZ of the annular disc RS and the stops $S_1, S_2$ of the connecting hubs $F_1, F_2$ in contact therewith to the shaft $W_1$ and the graduated plate T. On a reversal of the prescribed turning direction of the shaft $W_2$, the shaft $W_1$ is no longer coupled to the shaft $W_2$ since the bolts BZ of the annular disc RS and the stop $S_2$ of the connecting hub $F_2$ go out of contact with one another. In order also in the event of this reverse turning direction of the shaft $W_2$ to assure contact between the bolts BZ of the annular disc RS and the stops $S_2$ of the connecting hub $F_2$, the shaft end away from the follower coupling $K_1$ of the shaft $W_1$ is coupled by means of a slip coupling $K_2$ with a drive motor M secured in the housing G. The drive motor M drives the shaft $W_1$ counter to the prescribed turning direction of the shaft $W_2$. Therefore, in both turning directions of the object $O_2$ to be measured, the two shafts $W_1, W_2$ are firmly joined with one another to rotate in unison. In this way, the relative position of the two objects $O_1, O_2$ to be measured can be determined exactly by the angle measuring system.

In order to determine a precise reference position for the measurement of the relative position between the two objects $O_1, O_2$ before the commencement of a new measurement, the object $O_2$ to be measured is rotated, with the drive motor M acting as described above, until a reference mark is scanned. In this reference position the counter is set to the value zero or to some other numerical value which was either previously established or determined by program operation.

If, during a processing operation and therefore a measuring cycle, a disturbance such as a power failure is encountered, then the operating course and therefore the measurement of the position of the rotatable object $O_2$ are interrupted. In the event of a power failure the measuring value present at the occurrence of the difficulty and therefore the previously determined reference position are both lost. Since, as explained above, the gripping device of an industrial robot as a rule cannot be moved arbitrarily during a processing operation, the object $O_2$ cannot be rotated until the scanning unit AE scans the original reference mark as was done before the commencement of the processing operation. For the reproducing of the reference position according to this invention, with the shaft $W_2$ at a standstill, the drive motor M is reversed in polarity.

The drive motor M turns the shaft $W_1$ with the graduated plate T by means of the slip coupling $K_2$ in the reverse turning direction until the scanning unit AE again scans the original reference mark, so that the counter is again set on the original value. Thereupon, the drive motor M is again reversed in polarity (direction) to the original direction of rotation, and the shaft $W_1$ with the graduated plate T is rotated back again up to the contact of the stops $S_1$ of the connecting hub $F_1$ with the bolts BZ of the annular disc RS. At this point the shaft $W_1$ and the graduated plate T again occupy the momentary position they occupied at the occurrence of the interruption. During this return of the shaft $W_1$ and the graduated plate T from the original reference mark to the momentary position prevailing at the time of the interruption, the increments of the graduation of the graduated plate T are counted in the counter. In this way the lost measuring value is recovered and the interrupted working operation and measuring process can be resumed.

Since the follower coupling $K_1$ includes bolts BZ offset with respect to one another in each case by an angle of 120° as well as stops $S_1, S_2$, a relative movement of the shaft $W_1$ with respect to the shaft $W_2$ in the calibrating process used to redetermine the reference position can be no greater than an angle of 240°. For this reason, at least two reference marks are required on the graduated plate T in order to ensure that the lost reference position can be determined during the calibration operation. The fact that more than one reference mark is required in turn requires a coding system such as code marks for distinguishing between the at least two reference marks. German Pat. No. 29 52 106 discloses one system suitable for use in distinguishing between at least two reference marks.

FIGS. 7a–7c show various views of an alternate follower coupling $K_1'$ which makes it possible to reproduce a lost reference position with only a single reference mark on the graduated plate T. This alternative follower coupling $K_1'$ makes it possible to rotate the shaft $W_1$ by an angle of greater than 360° with respect to the shaft $W_2$. The follower coupling $K_1'$ includes a connecting hub $F_2'$ which defines three stops $S_2'$ which are offset with respect to one another by 120°. The connecting hub $F_2'$ as shown in FIG. 7b is identical with the connecting hub $F_2$ of FIG. 6. The connecting hub $F_1'$ for the connection of the shaft $W_1$ defines as shown in FIGS. 7b and 7c three radially and axially recessed concentric steps $U_1', U_2', U_3'$. From each of the steps $U_1', U_2', U_3'$, there projects in the radial direction a respective stop $S_1'$. The three stops $S_1'$ on the three steps $U_1', U_2', U_3'$ are offset with respect to one another in each case by 120°. The annular disc $RS'$ serves to mount three bolts $BZ_2'$ which are offset with respect to one another by 120°. These bolts $BZ_2'$ are oriented to extend in the axial direction and to project toward the connecting hub $F_2'$ near the periphery of the annular disc $RS'$. These three bolts $BZ_2'$ are positioned to contact the stops $S_2'$ of the connecting hub $F_2'$, as shown in FIG. 7b. On the side of the annular disc $RS'$ facing the connecting hub $F_1'$ there are defined three radially and axially recessed concentric steps $U_1'', U_2'', U_3''$. From each step $U_1'', U_2'', U_3''$ there projects a respective bolt $BZ_1'$ in the axial direction. The three bolts $BZ_1'$ on the three steps $U_1'', U_2'', U_3''$ are offset with respect to one another by 120° and are positioned to come into contact in each case with the respective one of the stops $S_1'$ of the connecting hub $F_1'$.

In a manner not shown, the stops $S_2'$ of the connecting hub $F_2'$ and the associated bolts $BZ_2'$ of the annular disc $RS'$ can be arranged on similar radially and axially recessed concentric steps. The coupling $K_1$ can also be constructed as a simple follower. The slip coupling $K_2$ can be constructed as an eddy current brake, as a hydraulic coupling, or as a magnetic follower. The graduated plate T can also be connected directly to the drive unit M.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

We claim:

1. A method for determining a reference position in an incremental path measuring system coupled to first and second relatively movable objects, the position of which are to be determined, said measuring system comprising a measuring graduation provided with at least one reference mark coupled to the first object and a scanning component coupled to the second object for scanning the graduation and the reference mark, said method comprising the following steps:

(a) after a selected time, when the first and second objects, the measuring graduation and the scanning component are in respective momentary positions, decoupling one of the measuring graduation and the scanning component from the respective one of the first and second objects;

(b) shifting said one of the measuring graduation and the scanning component until one of the reference marks is scanned;

(c) returning the shifted one of the measuring graduation and the scanning component to the respective momentary position and then fixing the relative position of the shifted one of the measuring graduation and the scanning component with respect to the respective one of the relatively movable objects; and (d) measuring the return path during step (c) between the scanning of the reference mark and the respective momentary position.

2. In an incremental path measuring system for measuring the relative position of first and second relatively movable components, said system comprising a carrier coupled to the first object, which carrier defines a measuring graduation and at least one reference mark having a predetermined absolute position with respect to a zero point of the measuring graduation, and a scanning unit coupled to the second object for scanning the graduation and the reference mark, the improvement comprising:

means for decoupling the scanning unit from the second object;

drive means for shifting the scanning unit from a starting position to at least a scanning position, at which the reference mark is scanned, and back to the starting position; and means for counting increments of the measuring graduation during the return movement of the scanning unit from the scanning position to the starting position with reference to the predetermined absolute position of the reference mark in order to determine the absolute position of the starting position with respect to the zero point of the measuring graduation.

3. The invention of claim 2 wherein the drive means comprises a motor which drives a gear linkage coupled to the scanning unit.

4. The invention of claim 3 wherein the scanning unit is mounted in a disc, and wherein the gear linkage comprises a gear wheel formed by the circumference of the disc.

5. The invention of claim 2 wherein the starting position is determined by a mechanical stop.

6. In an incremental path measuring system for measuring the relative position of first and second relatively movable components, said system comprising a carrier coupled to the first object, which carrier defines a measuring graduation, a plurality of reference marks, each having a respective predetermined absolute position with respect to a zero point of the measuring graduation, and a plurality of code marks, each associated with a respective one of the reference marks and indicative of the respective predetermined absolute position, and a scanning unit for scanning the measuring graduation, the reference marks and the code marks and coupled to the second object, said scanning unit comprising a light source, a scanning plate, and at least one photosensor, the improvement comprising:

means for decoupling the scanning plate from the second object;

drive means for shifting the scanning plate from a starting position to at least a scanning position, at which a next one of the reference marks is scanned, and back to the starting position;

means for holding the light source and the photosensors fixedly in place with respect to the second object, the one of the photosensors aligned with the reference marks extending over a length at least as large as the separation between adjacent ones of the reference marks;

means for counting increments of the measuring graduation during the return movement of the scanning plate from the scanning position to the starting position with reference to the predetermined absolute position of the scanned one of the reference marks in order to determine the absolute position of the starting position with respect to the zero point of the measuring graduation.

7. The invention of claim 6 wherein the plurality of reference marks are arranged on the carrier such that for all positions of the carrier at least one of the reference marks is illuminated by the light source.

8. The invention of claim 6 wherein the drive means comprises:
- a motor;
- an eccentric rotated by the motor; and
- a bearing surface coupled to the scanning plate and positioned to contact the eccentric.

9. The invention of claim 8 wherein the bearing surface is defined by a fork which brackets the eccentric, and wherein one revolution of the motor driven eccentric shifts the scanning plate to at least the scanning position and back to the starting position.

10. The invention of claim 9 further comprising:
- a switching arm;
- a switch coupled to the motor;
- means for coupling one of the switching arm and the switch to the scanning plate such that the switch de-energizes the motor when the scanning plate returns to the starting position.

11. The invention of claim 6 wherein the starting position is determined by a mechanical stop.

12. The invention of claim 6 wherein the measuring system is an angular position measuring system, wherein the carrier is fixedly mounted on a pickup shaft, and wherein the scanning plate is mounted on a disc which is mounted for rotation with respect to the carrier.

13. In an incremental path measuring system for measuring the relative position of first and second relatively movable components, said system comprising a carrier coupled to the first object, which carrier defines a measuring graduation and at least one reference mark having a predetermined absolute position with respect to a zero point of the measuring graduation, and a scanning unit coupled to the second object for scanning the graduation and the reference mark, the improvement comprising:

means for coupling the carrier which defines the measuring graduation to the first object to transmit motion in a first direction from the first object to the carrier while permitting relative movement therebetween in a reverse direction;

a drive unit coupled to move the carrier in the reverse direction, said drive unit being reversable in direction of movement; and means for fixedly joining the scanning unit with the second object.

14. The invention of claim 13 wherein the coupling means comprises:
- a first shaft connected to the carrier;
- a second shaft connected to the first object;
- a first hub connected to the first shaft and defining three radially oriented first stops positioned at 120° intervals around the periphery of the first hub;
- a second hub connected to the second shaft and defining three radially oriented second stops positioned at 120° intervals around the periphery of the second hub; and
- an annular disc disposed between the first and second hubs, said disc defining two sets of three axially oriented bolts offset by 120° with respect to one another around the periphery of the disc and arranged to bear against respective ones of the first and second stops.

15. The invention of claim 14 wherein the stops on at least one of the first and second hubs are arranged on concentric surfaces of the hub, which surfaces are offset with respect to one another in at least one of the radial and axial directions, and wherein the annular disc is shaped to ensure that the associated bolts are offset in a corresponding manner to engage the stops.

16. The invention of claim 13 wherein the drive unit is coupled to the carrier by means of a slip coupling.

* * * * *